United States Patent [19]

Sekmakas et al.

[11] 4,040,995
[45] Aug. 9, 1977

[54] HIGH SOLIDS OVERPRINT VARNISH

[75] Inventors: Kazys Sekmakas; George E. Gotschall, both of Chicago, Ill.

[73] Assignee: DeSoto, Inc., Des Plaines, Ill.

[21] Appl. No.: 712,697

[22] Filed: Aug. 9, 1976

[51] Int. Cl.$^2$ .......................... C09D 3/52; C09D 3/66
[52] U.S. Cl. .................. 260/22 CQ; 260/21; 260/22 R
[58] Field of Search .................. 260/22 CQ, 22 R, 21

[56] References Cited

U.S. PATENT DOCUMENTS

| | | | |
|---|---|---|---|
| 2,218,474 | 10/1940 | Moore | 260/22 CQ |
| 3,207,715 | 9/1965 | Stephens | 260/22 M |
| 3,223,658 | 12/1965 | Kraft et al. | 260/22 M |
| 3,267,174 | 8/1966 | Fry et al. | 260/29.4 R |
| 3,352,806 | 11/1967 | Hicks | 260/33.4 R |
| 3,530,082 | 9/1970 | O'Gorman et al. | 260/22 EP |
| 3,714,090 | 1/1973 | Lasher | 260/22 CQ |
| 3,893,959 | 7/1975 | Layman | 260/22 CQ |
| 3,920,595 | 11/1975 | Anderson et al. | 260/22 EP |

Primary Examiner—Ronald W. Griffin
Attorney, Agent, or Firm—Dressler, Goldsmith, Clement, Gordon, & Shore, Ltd.

[57] ABSTRACT

A fluid overprint varnish containing less than about 30% of volatile organic solvent and which cures on baking is provided, said varnish consisting essentially of a mixture of: (1) an hydroxy functional saturated oil-modified polyester based on a blend of pentaerythritol or higher functional polyhydric alcohol with a diol having a neo-structure; (2) a liquid low volatile dihydric alcohol; and (3) a liquid hexafunctional malamine resin, preferably hexamethoxymethyl malamine.

19 Claims, No Drawings

HIGH SOLIDS OVERPRINT VARNISH

This invention relates to high solids content coating solutions containing saturated oil-modified pentaerythritol based polyester resins (these may be termed alkyd resins) which are particularly adapted to provide overprint varnishes which can be applied over wet ink.

High solids content coating solutions based on a combination of hydroxy functional resin, liquid polyhydric alcohol and aminoplast resin are known, the polyhydric alcohol serving to reduce the proportion of volatile organic solvent needed to provide coating viscosity as taught in United States Pat. Nos. 3,267,174 and 3,352,806. The usual hydroxy functional resins are acrylic copolymers, but these do not provide the best coating characteristics, particularly in a clear varnish intended to be applied as a continuous film over wet ink. Also, surfaces to be coated are sometimes contaminated, as with oily contaminants, and the acrylic systems do not provide the best coverage over such surfaces.

Oil-modified alkyd resins have been suggested to provide the hydroxy functional resin, as in U.S. Pat. No. 3,920,595, but glycerin-based alkyds containing unsaturated oils are stressed in this patent, and it has been found that saturated oils are necessary to avoid undesired odor and discoloration. Also, more highly branched structures as are provided using alcohols of higher functionality are needed because the glycerin-based systems yield films which are unduly soft.

In the present invention, a high solids overprint varnish for can coatings and similar utilities is provided by combining:
1. a hydroxy functional saturated oil-modified polyester based on a blend of pentaerythritol or higher functional polyhydric alcohol with a diol having a neo-structure;
2. A liquid low volatile dihydric alcohol; and
3. a liquid hexafunctional melamine resin.

It is stressed that in the present invention, the hydroxy functional oil-modified polyester is a highly branced structure and it is cured with a liquid highly branched melamine resin. This permits a low viscosity diol to be used to further reduce the proportion of volatile organic solvent. The advantage of the combination is that it permits the solids content of the coating to be significantly increased even though the high performance characteristics of conventional overprint varnishes are not sacrificed. Thus, and per this invention, we can duplicate the characteristics of existing overprint varnishes, which contain about 40-50% of volatile organic solvent, by using a varnish which contains less than 30% volatile solvent, preferably only 10-20% volatile solvent. Of course, the oil-modified polyester used in the prior art varnish must be changed as taught herein to enable this dual result to be obtained.

Referring first to the hydroxy functional polyester which is employed in this invention, this polyester includes four essential components, namely:
- A. a polyhydric alcohol containing at least four hydroxy groups per molecule;
- B. diol having a neo-structure;
- C. a dicarboxylic acid component; and
- D. a saturated oil or fatty acid derived therefrom.

The polyhydric alcohol containing at least four hydroxy groups per molecule is preferably pentaerythritol, though dipentaerythritol is also useful. Polyhydric alcohols of high functionality are further illustrated by sucrose and sorbitol.

The diol having a neo-structure is of considerable importance. Only a single neo-structured diol has been found to be suitable, namely, 2,2-dimethyl-3-hydroxypropyl-2,2- -dimethyl-3-hydroxypropionate which has the formula:

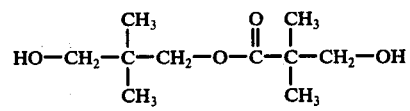

The equivalent ratio of carboxyl to hydroxyl functionality in the polyester is from 0.5 to 0.8 equivalents of carboxyl per equivalent of hydroxyl, and more preferably is from 0.6 to 0.75.

The bulk of the hydroxy functionality in this invention is supplied by the polyhydric alcohol which contains at least four hydroxy groups, and the balance of the hydroxy functionality will consist essentially of the neo-structured diol. In preferred practice, the neo-structured diol will provide from 20% to 45% of the total hydroxy functionality and more preferably from 25% to 40%.

The dicarboxylic acid component of the polyester will consist essentially of any diacid lacking polymerizable unsaturation, and is usually constituted by an aromatic dicarboxylic acid such as phthalic acid. The preferred phthalic acid is o-phthalic acid which is preferably employed as an anhydride, namely, phthalic anhydride. Other dicarboxylic acids which are useful are adipic acid, succinic acid, and the like, but a phthalic acid preferably constitutes the bulk of this component. Small amounts up to about 15% of the carboxyl functionality may be provided by maleic acid, fumaric acid, or other ethylenicallyunsaturated diacid. Also, up to about 10% of the carboxyl functionality may be provided by a monocarboxylic acid, such as benzoic acid, or a tricarboxylic acid, such as trimellitic acid or anhydride.

The saturated oil or fatty acid derived therefrom is preferably coconut oil or coconut oil fatty acid, the fatty acid providing the best results.

The useful saturated fatty acids contain from 10-22 carbon atoms and are illustrated by decanoic acid (capric), dodecanoic acid (lauric), tetradeconoic acid (myristic), hexadecanoic acid (palmitic), octadecanoic acid (stearic), and arachdic and behenic acids. These may be provided in commercial oils or acid mixtures therefrom, e.g., coconut oil providing a mixture of acids in which capric and lauric acids predominate.

The fatty acid component (or the oil which supplies the same) should provide from 10-40%, preferably from 15-30%, of the total carboxyl functionality in the polyester.

The polyester component is provided by heat reacting the constituents in conventional fashion, but it is preferred to first esterify the polyhydric alcohol of high functionality with the saturated fatty acids, and then to add the remaining components. The final polyester is hydroxy functional and preferably has an acid value below about 30. The reaction is conventionally carried out using a reaction temperature of about 150°-250° C., and a small amount of inert solvent, e.g., xylol, to assist is the removal of the water of reaction.

As previously indicated, the coating compositions of this invention include a liquid polyhydric alcohol and a liquid hexafunctional melamine resin. While it is broadly known to reduce the proportion of volatile organic solvent which is needed by employing a polyhydric alcohol of low volatility, the present invention requires that the aminoplast resin be a liquid resin of high functionality as previously noted, and it also requires that the liquid polyhydric alcohol be dihydric.

Referring more particularly to the dihydric liquids which may be used, these are illustrated by polyoxyethylene, and polyoxypropylene having a molecular weight sufficient to minimize volatilization during the elevated temperature cure which is relied upon. An average molecular weight of at least about 350, preferably at least 500, is normally utilized for this purpose. The maximum average molecular weight is determined by the liquidity and viscosity of the dihydric alcohol, it being preferred to employ a dihydric alcohol having an average molecular weight of less than 2000, preferably less than 1000.

In addition to polyethers as above-noted, other polyethers such as ethylene oxide or propylene oxide adducts of butane diol or hexane diol are also useful. Similar polyesters such as are provided by reacting an excess of ethylene oxide or propylene oxide with a dicarboxylic acid, such as succinic acid, are also useful. It is also possible to react two moles of a lactone, such as epsilon caprolactone, with a dihydric alcohol such as butane diol, or the like.

The hexafunctional melamine resin is preferably constituted by hexamethoxymethyl melamine, which is a liquid of relatively low viscosity. Similar products in which all or a portion of the methy either is replaced by the ethyl, propyl or butyl ether are also useful.

As described hereinbefore, there are three essential components in the overprint varnish of this invention, namely, hydroxy functional polyester, polyhydric alcohol, and aminoplast resin. The polyester should constitute from 10 to 50%, preferably from 20 to 40% of the mixture. The liquid diol should constitute from 10 to 40%, preferably from 15 to 35%, of the mixture. Lastly, the liquid melamine resin should constitute from 20 to 60%, preferably 30 to 55%, of the mixture.

It is desired to point out that the coating compositions of this invention are liquids which can be applied in any desired fashion, but they are preferably applied by roll coating. It will also be understood that the coatings are thermosetting, and that the thermosetting cure is obtained by the application of heat. Baking temperatures can vary widely from about 250° F. to 500° F., and these temperatures may be employed for periods of time ranging from about 1 hour at the lowest temperatures to about 30 seconds at the highest tempertures. A typical baking schedule is illustrated by placing the coated substrate in an oven heated at a temperature in the range of 325°-350° F. for about 8 minutes.

In connection with the baking conditions, it will be appreciated that the primary reaction involved in the cure is the reaction between the N-methylol groups of the melamine resin with the hydroxy groups which are present on both the oil-modified polyester resin, and the liquid low volatile diol. This reaction is assisted, as is well known, by the presence of a small amount of an acid catalyst. These acid catalysts are illustrated by p-toluene sulfonic acid, but many others are well known for the purpose.

It will still further be appreciated that numerous auxiliary materials are commonly present in overprint varnishes, such as silicone oils and other lubricants, flow control agents, and the like, but these are conventional, and form no part of this invention.

The invention is illustrated in the examples which follow, it being understood that all proportions herein are by weight unless otherwise indicated.

EXAMPLE I

Charge Composition

1260 Coconut Fatty Acids
540 Pentaerythritol
70 Xylol
   Charge into reactor. Set trap with xylol. Heat to 200° C. (reflux) and remove water of reaction, as produced. Continue until the acid value is reduced to 75.
900   2,2-dimethyl-3-hydroxypropyl-2,2-dimethyl-3-hydroxypropionate
825 Phthalic Anhydride
65 Benzoic Acid
15 Maleic Anhydride
20 Xylol
   Add the above. Reheat to 220° C. Hold for an acid value of 16–17 and cool.
185 2-Butoxy ethanol - add.

The final characteristics of the hydroxy functional polyester resin solution are:
Solids (nonvolatile material); 90.3%
Viscosity (Gardner); $Z_4$
Color (Gardner); 3–4
Acid value of nonvolatiles; 16.9

EXAMPLE II

Preparation of Overprint Varnish

Charge Composition

260; Hydroxy Functional Polyester Resin Solution of Example I
198; Polyoxypropylene having a molecular weight of about 700.
325; Hexamethoxymethyl Melamine
6; Silicone Oil
4; Triethyl Amine
36; Polyolefin Lubricant Solution (18% Solution in Aromatic Solvent)
38; 2-Butoxy Ethanol
20; Mineral Spirits The above are combined by simple mixing, starting with the polyester resin solution.
4; Acid Catalyst
12; 2-Methoxy Ethanol
Add the premixture of the catalyst and the solvent.
9; 2-Methoxy Ethanol - add for viscosity adjustment.

The resulting solution contains 84.22% solids by weight, and is suitable for roll coat application.

Evaluation

The roll coat application of the resin solution of Example II on various substrates was carried out to provide the following coating properties.

| Wet Coating Properties | |
|---|---|
| Solids by Weight | 84.22 |
| Viscosity | 60 ± 5 sec No. 4 Ford Cup |
| Contains | Polyolefin Lubricant |
| Application | Roll Coat |

| Wet Coating Properties | |
|---|---|
| Substrate | Tinplate |
| | Tin Free Steel |
| | Aluminum |
| Film Weight | 3.0 ± .5 mg/in$^2$ |
| Cure Schedule | 325° – 350° F. for 8 minutes |
| Coating Appearance: | High Gloss |
| | Good Flow and Leveling |
| | Excellent wetting over some inks, some problem inks. Generally wets substrate well. |
| Film Properties: | Good slip properties. |
| | Coefficient of Friction - about 0.10 |
| | Pencil hardness: F-HB. |
| | 30 minutes in water at 160° F. caused no blush or adhesion loss. |
| | Resists blocking |
| | Resists Methylene Chloride |
| | No residual odor |

The above coating characteristics are essentially identical to those obtained using a commercial coconut alkyd melamine overprint varnish, but the commercial counterpart has a solids content of only 56%. It is surprising to be able to provide a polyester resin which will provide the same final properties despite the presence of a significant proportion of dihydric alcohol in the final cured film.

The invention is defined in the claims which follow.

We claim:

1. A fluid overprint varnish containing less than about 30% of volatile organic solvent and which cures on baking, said varnish consisting essentially of a mixture of:
   1. an hydroxy functional, oil-modified polyester resin consisting essentially of;
      A. a polyhydric alcohol containing at least four hydroxy groups per molecule;
      B. diol having a neo-structure, said diol being 2,2-dimethyl-3-hydroxypropyl-2,2-dimethyl-3-hydroxypropionate;
      C. a dicarboxylic acid component; and
      D. a saturated oil or fatty acid derived therefrom; the oil-modified polyester having an equivalent ratio of carboxyl to hydroxyl functionalities of from 0.5 to 0.8 equivalents of carboxyl per equivalent of hydroxyl, said neo-structured diol providing from 20% to 45% of the total hydroxy functionality in said polyester, and the fatty acid in said oil or fatty acid providing from 10 to 40% of the total carboxyl functionality in the polyester,
   2. liquid low volatile diol; and
   3. liquid hexafunctional melamine resin; said oil-modified polyester constituting from about 10 – 50% of the mixture, the liquid diol constituting from about 10 – 40% of the mixture, and the balance of the mixture of the three components consisting essentially of said liquid melamine resin.

2. a varnish as recited in claim 1 in which said polyhydric alcohol is pentaerythritol.

3. A varnish as recited in claim 1 in which said dicarboxylic acid component consists essentially of a phthalic acid.

4. A varnish as recited in claim 3 in which said phthalic acid is orthophthalic acid or phthalic anhydride.

5. A varnish as recited in claim 1 in which said dicarboxylic acid component includes up to about 15% of a monoethylenically unsaturated carboxylic acid.

6. A varnish as recited in claim 1 in which up to about 10% of the carboxyl functionality contained in the components of said polyester is provided by benzoic acid.

7. A varnish as recited in claim 1 in which the volatile solvent content of said varnish is from 10–20%.

8. A varnish as recited in claim 1 in which said component (D) is constituted by fatty acid.

9. A varnish as recited in claim 8 in which said fatty acid is coconut oil fatty acid.

10. A varnish as recited in claim 8 in which said polyester has an equivalent ratio of from 0.6 to 0.75 equivalents of carboxyl per equivalent of hydroxyl.

11. A varnish as recited in claim 1 in which said polyester has an acid value below about 30.

12. A varnish as recited in claim 1 in which said diol has an average molecular weight of at least about 350.

13. A varnish as recited in claim 12 in which said diol has an average molecular weight less than 2000.

14. A varnish as recited in claim 13 in which said diol is a polyether.

15. A varnish as recited in claim 14 in which said polyether is polyoxypropylene.

16. A varnish as recited in claim 1 in which said melamine resin is hexamethoxy methyl melamine.

17. A varnish as recited in claim 1 in which said oil-modified polyester constitutes from 20–40% of the mixture, said liquid low volatile diol constitutes from 15–35% of the mixture, and the melamine resin constitutes from 30–55% of the mixture.

18. A fluid overprint varnish containing less than about 30% of volatile organic solvent and which cures on baking, said varnish consisting essentially of a mixture of:
   1. 10–50% of an hydroxy functional, oil-modified polyester resin having an acid value below about 30 and consisting essentially of:
      A. pentaerythritol;
      B. diol having a neo-structure, siad diol being 2,2-dimethyl-3-hydroxypropyl-2,2-dimethyl-3-hydroxypropionate;
      C. phthalic acid; and
      D. saturated fatty acid; the oil-modified polyester having an equivalent ratio of carboxyl to hydroxyl functionalities of from 0.5 to 0.8 equivalents of carboxyl per equivalent of hydroxyl, said neo-structured diol providing from 20% to 45% of the total hydroxy functionality in said polyester, and the fatty acid in said oil or fatty acid providing from 10 to 40% of the total carboxyl functionality in the polyester,
   2. 10–40% of liquid low volatile polyether having an average molecular weight of 350-2000; and
   3. the balance of the mixture of the three components consisting essentially of hexamethoxymethyl melamine.

19. A varnish as recited in claim 18 in which the volatile solvent content of said varnish is from 10–20%, said polyester has an equivalent ratio of from 0.6 to 0.75 equivalents of carboxyl per equivalent of hydroxyl and constitutes from 20–40% of the mixture, said liquid low volatile diol constitutes from 15–35% of the mixture, and the melamine resin constitutes from 30–55% of the mixture.

* * * * *